United States Patent
Takeda et al.

[11] Patent Number: 5,833,563
[45] Date of Patent: Nov. 10, 1998

[54] AUTOMATIC HYDRAULIC TENSIONER

[75] Inventors: Toshio Takeda, Nagoya; Yukimori Kobayashi, Gamagori; Katsumi Hirabayashi, Anjo; Shinji Kazaoka, Chiryu, all of Japan

[73] Assignee: Aisin Seiki Kabushiki Kaisha, Aichi-pref., Japan

[21] Appl. No.: 956,446

[22] Filed: Oct. 23, 1997

[30] Foreign Application Priority Data

Oct. 23, 1996 [JP] Japan .................................. 8-281059

[51] Int. Cl.⁶ .............................. F16H 7/08; F16H 7/12
[52] U.S. Cl. ................................. 474/138; 474/110
[58] Field of Search .................................. 474/135, 136, 474/138, 101, 110, 109, 111, 112; 188/280, 282.7; 92/79

[56] References Cited

U.S. PATENT DOCUMENTS

| | | | |
|---|---|---|---|
| 4,985 | 1/1991 | Schmidt et al. | 474/110 |
| 4,708,696 | 11/1987 | Kimura et al. | 474/138 X |
| 4,772,251 | 9/1988 | Goppelt et al. | 474/138 X |
| 4,790,796 | 12/1988 | Okabe et al. | 474/110 |
| 4,950,209 | 8/1990 | Kawashima et al. | |

FOREIGN PATENT DOCUMENTS

| | | |
|---|---|---|
| 3-65041 | 6/1991 | Japan . |
| 7-110563 | 4/1995 | Japan . |

*Primary Examiner*—Charles A. Marmor
*Assistant Examiner*—Marcus Charles
*Attorney, Agent, or Firm*—Hazel & Thomas, P.C.

[57] ABSTRACT

An automatic hydraulic tensioner according to the present invention is provided with a communication mechanism for allowing a space radially inside a plunger-side end wire portion of a coil spring to communicate with a small clearance between the plunger and a cylinder. This automatic hydraulic tensioner thus succeeds, with a simple structure, in preventing bubbles from remaining within a pressure chamber and appropriately maintaining the tension applied to a power transmitting means such as a belt, a chain or the like.

12 Claims, 12 Drawing Sheets

AUTOMATIC HYDRAULIC TENSIONER

Japanese Patent Application No. 8-281059 filed on Oct. 23, 1996, including specification, drawings and abstract is incorporated herein by reference in its entirety.

BACKGROUND OF THE INVENTION

1. Field of the Invention

The present invention relates to an automatic hydraulic tensioner for appropriately maintaining the tension applied to a power transmitting means such as a timing belt, a timing chain or the like of an engine.

2. Description of the Related Art

In order to drive a camshaft in synchronization with the rotating movement of a crankshaft of the engine, there is provided a power transmitting means such as a timing belt, a timing chain or the like between the shafts, with a predetermined tension being applied to the power transmitting means. However, when the pitch between the shafts is increased with an increase in temperature after the engine start-up, the power transmitting means is stretched, so that the tension applied thereto is increased excessively. This results in generation of noise and reduction in life of the power transmitting means. If a relatively small tension is initially applied to the power transmitting means with a view to eliminating such shortcomings, the power transmitting means may be disengaged from the shafts upon start-up of the engine, so that power cannot be transmitted appropriately. Accordingly, in order to meet ever-increasing demands in the market, there have been proposed a number of automatic hydraulic tensioners capable of solving the aforementioned problems by appropriately maintaining the tension applied to the power transmitting means.

One of such automatic hydraulic tensioners is disclosed in Japanese Patent Laid-Open No. HEI 7(1995)-110056. The automatic hydraulic tensioner disclosed herein includes: a cylinder having one and closed and the other end open; a plunger slidably fitted within the cylinder with a small clearance there between in accordance with changes in the tension applied to a power transmitting means such as a belt, a chain or the like; a pressure chamber defined by the plunger and the closed end of the cylinder; a reservoir chamber defined by the plunger and the open end of the cylinder, the reservoir chamber being capable of communicating with the pressure chamber through the small clearance; a cylindrical coil spring disposed within the pressure chamber and having one end securely engaged with the cylinder and the other end engaged with an end surface of the plunger so that the cylindrical coil spring continuously urges the plunger in one direction toward the reservoir chamber; and a damper mechanism provided between the pressure chamber and the reservoir chamber, the damper mechanism allowing the plunger to slide quickly in one direction with the aid of the coil spring in response to a decrease in the tension applied to the power transmitting means, and the damper mechanism cooperating with the small clearance to allow the plunger to slide slowly in the other direction against the urging force of the coil spring in response to an increase in the tension applied to the power transmitting means.

According to the aforementioned conventional automatic hydraulic tensioner, the plunger slides in opposed directions repeatedly such that the tension applied to the power transmitting means is always kept appropriate, thus preventing noise generation as well as reduction in life of the power transmitting means.

As described above, when the tension applied to the power transmitting means is reduced, the damper mechanism operates to allow the plunger to slide quickly toward the reservoir chamber with the aid of the urging force of the coil spring. As a result, the volume of the pressure chamber is increased, so that a negative pressure state is generated. Thereby the air dissolved in hydraulic fluid in the pressure chamber appears as bubbles. Referring now to FIG. 23, the aforementioned automatic hydraulic tensioner will be described. As shown in FIG. 23, when a plunger 201 slides toward a pressure chamber 203, the bubbles that have risen up in the pressure chamber 203 and entered an annular space between a wire of a coil spring 202 and a cylinder 200 are discharged into a reservoir chamber 204 through a small clearance between the plunger 201 and the cylinder 200. However, the bubbles that have entered a space radially inside the wire of the coil spring 202 within a recess 205 formed between the wire of the coil spring 202 and the plunger 201. Since the remaining bubbles are elastically compressible, they become compressed with an increase in the tension applied to the power transmitting means, thus allowing the plunger 201 to slide quickly toward the pressure chamber 203. Therefore the damping performance deteriorates to such an extent that the tension applied to the power transmitting means can no longer be kept appropriate. This leads to an unacceptable movement of the power transmitting means, which may result in noise generation as well as reduction in life.

In order to solve these problems, there is proposed an automatic hydraulic tensioner capable of preventing the generation of bubbles, wherein the reservoir chamber has therein a piston that is continuously urged toward the plunger to force hydraulic fluid from the reservoir chamber into the pressure chamber with enhanced efficiently when the plunger slides toward the reservoir chamber with a decrease in the tension applied to the power transmitting means. However, this automatic hydraulic tensioner causes structure complication, requires quite a number of parts, and thereby raises the manufacturing cost.

SUMMARY OF THE INVENTION

It is thus an object of the present invention to provide an improved automatic hydraulic tensioner which overcomes the above drawbacks.

It is another object of the present invention to provide an improved automatic hydraulic tensioner that is, with a simple structure, capable of preventing bubbles from remaining within a pressure chamber and appropriately maintaining the tension applied to power transmitting means.

According to one aspect of the present invention, there is provided an automatic hydraulic tensioner having a communication means that communicates a space radially inside a coil spring wire engaged with a plunger with a small clearance between a cylinder and the plunger.

According to another aspect of the present invention, the communication means may be a plurality of communication grooves that are formed in an end surface of the plunger and extend from the space radially inside the coil spring wire engaged with the plunger to the outer periphery of the plunger.

According to still another aspect of the present invention, the communication means may also be an annular member interposed between the end surface of the plunger and the plunger-side end wire portion of the coil spring, the annular member having at least on one side thereof a plurality of groove portions extending from the space radially inside the end of the coil spring wire to the outer periphery of the annular member.

It is desirable that the aforementioned communication grooves and groove portions become broader or deeper toward the outer periphery.

Furthermore, the communication grooves and the annular member may be corrugated in the circumferential direction to form a plurality of groove portions between the end surface of the plunger and the aforementioned end of the coil spring wire.

In addition, the communication means may be a plurality of communication holes that are formed in the plunger and extend from the end surface of the plunger exposed to the space radially inside the aforementioned end of the coil spring wire to the small clearance.

Accordingly, the bubbles that are produced within the pressure chamber when the damper mechanism allows the plunger to slide quickly toward the reservoir chamber with the aid of the urging force of the coil spring are introduced through the communication means into the small clearance between the plunger and the cylinder. Then the bubbles are discharged together with hydraulic fluid into the reservoir chamber when the plunger slide toward the pressure chamber against the urging force of the coil spring.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
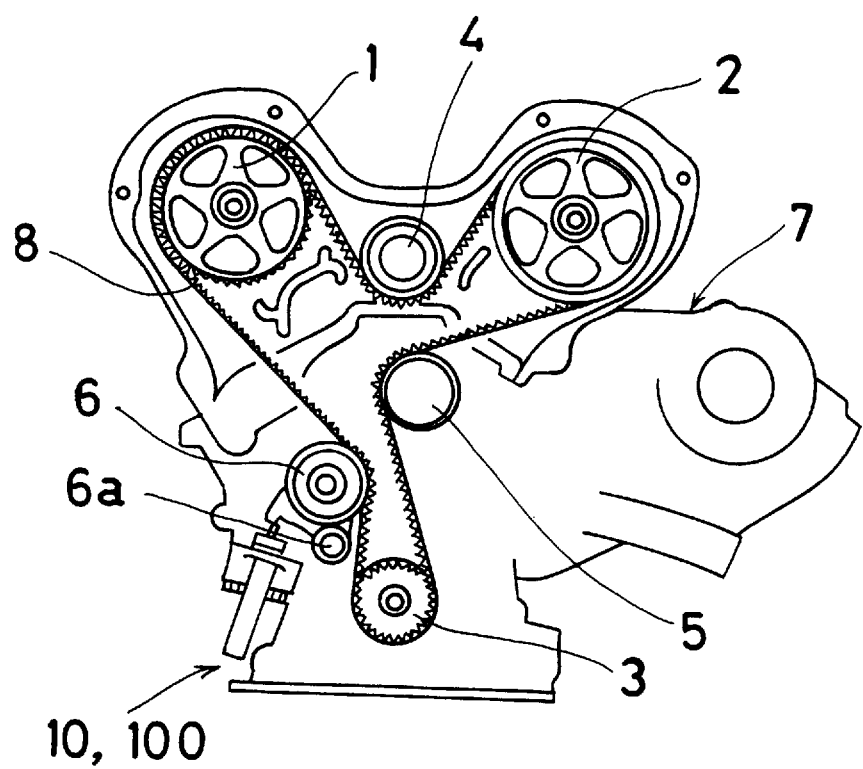
FIG. 1 is a schematic view showing an automatic hydraulic tensioner according to the present invention that is mounted on an engine.

Preferred embodiments of an automatic hydraulic tensioner according to the present invention will now be described in conjunction with the accompanying drawings. FIG. 1 shows the external appearance of an automatic hydraulic tensioner 10, 100 according to the present invention that in mounted on a V-type engine. As shown in FIG. 1, there is interposed between a crank pulley 3 and cam pulleys 1, 2 a timing belt 8, to which a predetermined tension in applied. The timing belt 8 serves as a power transmitting means, the crank pulley 3 is fixed to a crankshaft, and the cam pulleys 1, 2 are fixed to respective camshafts. A stationary idler 4 is provided between the cam pulleys 1, 2, while a stationary idler 5 is provided between the cam pulley 2 and the crank pulley 3. These stationary idlers 4, 5 rotate in accordance with the rotating movement of the timing belt 8 and apply a predetermined tension thereto. The stationary idler 4 and/or the stationary idler 5 may be a pulley for an auxiliary element that is driven by the timing belt 8. In addition, a rocking idler 6 is provided between the crank pulley 3 and the cam pulley 1. The rocking idler 6 is capable of rolling on the timing belt 8 when it moves. The rocking idler 6 rocks around a rocking fulcrum 6a thereof if the tension applied to the timing belt 8 is changed. Furthermore, the automatic hydraulic tensioner 10, 100 of the present invention includes a rod 13 that elastically abuts on the rocking idler 6. The rod 13 will be described later. Therefore the rocking idler 6 is always urged clockwise as viewed in FIG. 1 around the rocking fulcrum 6a, so that an appropriate tension is continuously applied to the timing belt 8 as will be described later.

Figure 2:
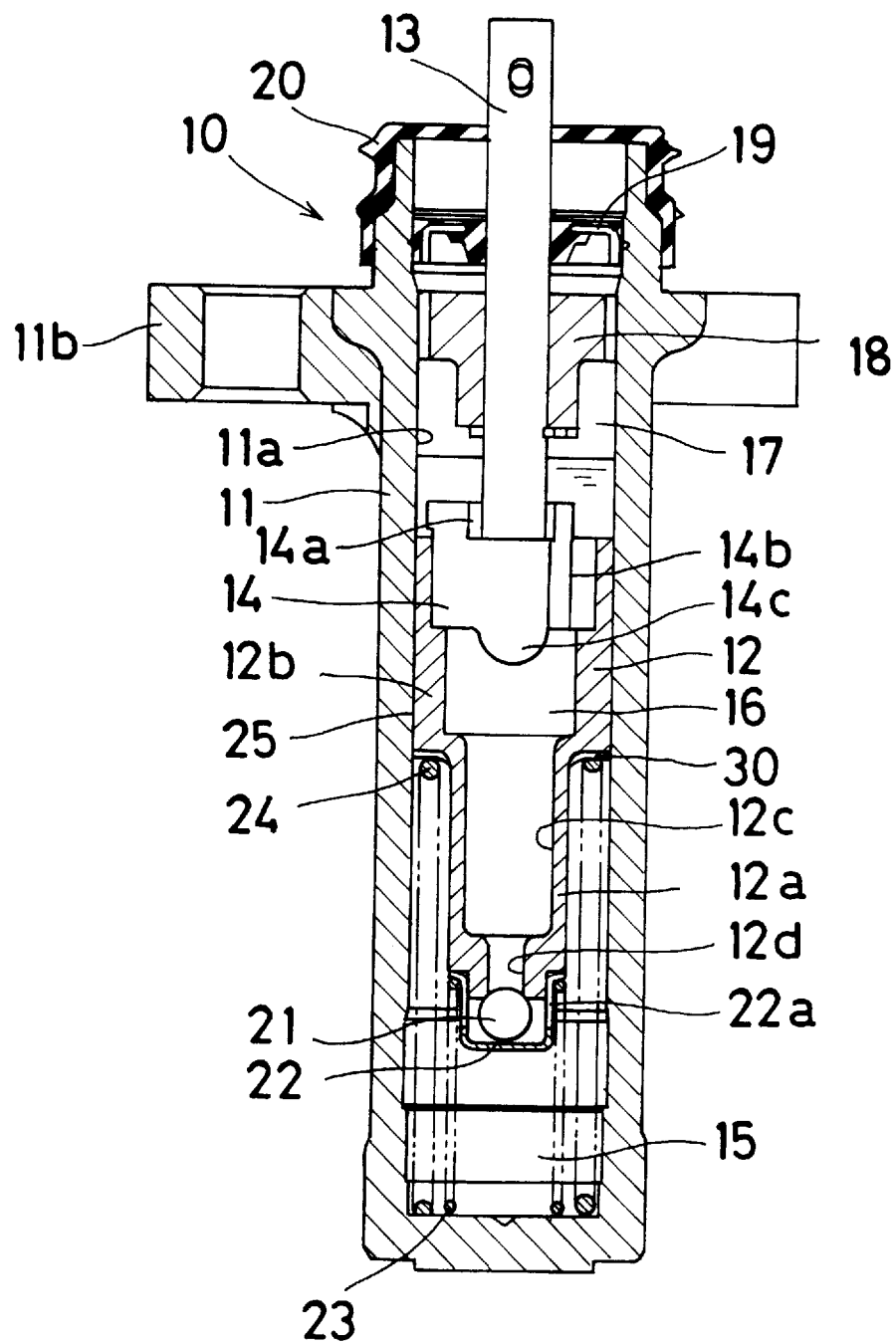
FIG. 2 is a longitudinal sectional view showing a first embodiment of the automatic hydraulic tensioner according to the present invention.

FIGS. 2 through 5 show a first embodiment of the automatic hydraulic tensioner according to the present invention. As shown in FIG. 2, the automatic tensioner 10 includes a cylinder 11 and a hollow plunger 12 with a stepped portion. One end of the cylinder 11 is closed, while the other end thereof is open. The plunger 12 has a large-diameter cylindrical portion 12b that is slidably fitted into an inner hole 11a of the cylinder 11 with a small clearance 25 therebetween and a small-diameter cylindrical portion 12a that coaxially extends, from one end of the large-diameter cylindrical portion 12b. The cylinder 11 has a flange portion 11b on the outer periphery thereof. As shown in FIG. 1, the cylinder 11 is fixed to a cylinder block of the engine through the flange portion 11b. The inner hole 11a is divided by the plunger 12 into a pressure chamber 15 an the closed-end side and a reservoir chamber 16 on the open-end side. More specifically, the reservoir chamber 16 is partially defined by a hollow portion 12c of the plunger 12.

In the inner periphery of an opening at the other end of the large-diameter cylindrical portion 12b of the plunger 12, there is formed an annular groove into which a plate member 14 is fitted. The plate member 14 has a plurality of notches 14b along the outer periphery thereof. The notches 14b allow the hollow portion 12c of the plunger 12 to communicate with a portion over the plate member 14 through the reservoir chamber 16. The plate member 14 has a recess 14a formed in the center of the upper surface thereof. The rod 13 extending from the open end of the cylinder 11 into the inner hole 11a has one end abutting on the rocking idler as illustrated in FIG. 1 and the other end loosely fitted in the recess 14a. Further, the plate member 14 has a hemispherical shaped projection 14c formed in the center of the lower surface thereof. FIG. 2 shows a rod guide 18, an oil seal 19 and a boot 20. The rod guide 18 restricts the inclination of the rod 13 and axially slidably holds the rod 13. The oil seal 19 prevents hydraulic fluid from leaking out of the cylinder 11. The boot 20 prevents dust from entering the cylinder 11. Furthermore, the oil seal 19 produces a sealed space within the inner hole 11a of the cylinder 11. This sealed space is divided by the plunger 12 into the pressure chamber 15 and the reservoir chamber 16 as described above. The pressure chamber 15 and the reservoir chamber 16 are filled with hydraulic fluid such that an air layer 17 is formed in the upper portion of the reservoir chamber 16.

A communication passage 12d is formed through the end surface of the small-diameter portion 12a facing the pressure chamber 15. An open-end portion of a cup-shaped retainer 22 is fitted around the end surface of the small-diameter portion 12a facing the pressure chamber 15. The open-end portion of the retainer 22 is provided with a flange extending radially outward. A coil spring 23 whose inner diameter is nearly equal to the outer diameter of the retainer 22 is interposed between the flange and the closed bottom surface of the inner hole 11a in the cylinder 11 to normally urge the plunger 12 toward the reservoir chamber 16 and to hold the retainer 22 on the plunger 12 such that the retainer 22 always moves together with the plunger 12. A plurality of slits 22a are formed around the retainer 22, so that the pressure chamber 15 and the reservoir chamber 16 can communicate with each other through the slits 22a and the communication passage 12d. The retainer 22 accommodates therein a check ball 21 that is movable in the axial direction of the plunger 12. When the pressure in the pressure chamber 15 becomes higher than that in the reservoir chamber 16, the check ball 21 moves toward the reservoir chamber 16 to close an open end of the communication passage 12d facing the pressure chamber 15. On the other hand, when the pressure in the pressure chamber 15 becomes lower than that in the reservoir chamber 16, the check ball 21 moves toward the pressure chamber 15 to open the communication passage 12d. The check ball 21 and the retainer 22 constitute together with the small clearance 25 the damper mechanism of the present invention. In the pressure chamber 15, there is provided a coil spring 24 in a stretched state. The coil spring 24 has one end securely engaged with the closed bottom surface of the inner hole 11a of the cylinder 11 and the other end securely engaged with a stepped portion formed between the small- and large-diameter cylindrical portions 12a, 12b of the plunger 12. Thus, the small-diameter portion 12a, the check ball 21, the retainer 22 and the coil spring 23 are positioned radially inside a wire constituting the coil spring 24. The coil spring 24, together with the coil spring 23, always urge the plunger 12 toward the reservoir chamber 16, so that the rod 13 causes the rocking idler 6 as illustrated in FIG. 1 to rock clockwise around the rocking fulcrum 6a. As a result, a predetermined tension is applied to the timing belt B.

Figure 3:
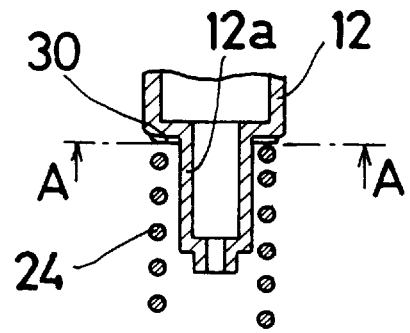
FIG. 3 is a sectional view showing a main part of the first embodiment as illustrated in FIG. 2.
Figure 4:
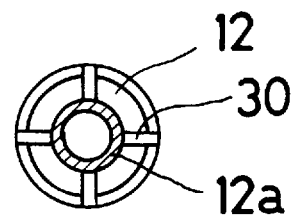
FIG. 4 is a sectional view taken along the line A—A of FIG. 3.
Figure 5:
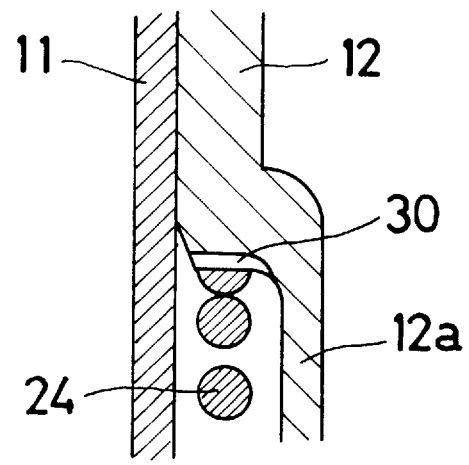
FIG. 5 is an enlarged sectional view showing a main part of the first embodiment as illustrated in FIG. 2.

According to the first embodiment, four radially extending grooves 30 are formed equally spaced apart from each other in the end surface of the stepped portion between the small- and large-diameter cylindrical portions 12a, 12b of the plunger 12, as shown in FIGS. 3 through 5. These grooves 30 allow the space radially inside the plunger-side end wire portion of the coil spring 24 to communicate with the space radially outside the plunger-side end wire portion of the same. in other words, the grooves 30 allow the space between the end wire portion and the outer periphery of the small-diameter cylindrical portion 12a of the plunger 12 to communicate with the space between the end wire portion and the inner periphery of the inner hole 11a of the cylinder 11. The grooves 30 constitute the commuunicating means of the present invention.

The operation of the first embodiment thus constructed will now be described.

While the engine is in operation, the rotation of the crankshaft is transmitted through the timing belt 8 to the camshafts. The camshafts then rotate to intermittently open and close intake valves and exhaust valves (not shown). Consequently, the processes of ignition and expansion are intermittently repeated. Accordingly, the crank pulley 3 and the cam pulleys 1, 2 do not rotate smoothly, which results in a change in the tension applied to the timing belt 8. The rocking idler 6 receives high frequency load fluctuations from the timing belt 8 in accordance with the engine rotational speed. The rocking idler thus rocks in one direction and the other around the rocking fulcrum 6a, so that the rod 13 and the plunger 12 reciprocate slightly (by about 0.2 mm).

If the tension applied to the timing belt 8 is increased, for example, during a rise in the engine rotational speed, the rocking idler 6 applies a large load to the rod 13 and the plunger 12 in the direction in which the rod 13 and the plunger 12 approach the pressure chamber 15. The rod 13 and the plunger 12 thus move against the urging forces of the coil springs 23, 24 toward the pressure chamber 15, so that the check ball 21 closes the communication passage 12d, thereby increasing the pressure in the pressure chamber 15. As a result, the hydraulic fluid in the pressure chamber 15 gradually leaks out through the small clearance 25 into the reservoir chamber 16. The rod 13 and the plunger 12 then move slowly toward the pressure chamber 15 in accordance with the amount of leakage to absorb the increase in the tension applied to the timing belt 8.

On the other hand, if the tension applied to the timing belt 8 is reduced, the rocking idler 6 applies a small load to the rod 13 and the plunger 12 in the direction in which the rod 13 and the plunger 12 approach the pressure chamber 15. The rod 13 and the plunger 12 thus move toward the reservoir chamber 16 with the aid of the urging forces of the coil springs 23, 24, causing the rocking idler 6 to follow the timing belt 8. In this state, the check ball 21 opens the communication passage 12d and the hydraulic fluid in the reservoir chamber 16 flows therethrough into the pressure chamber 15. Therefore, the rod 13 and the plunger 12 quickly move toward the reservoir chamber 16 with the aid of the urging forces of the coil springs 23, 24, thereby stretching the timing belt 8 again.

Since the rod 13 and the plunger 12 reciprocate repeatedly in this manner, the tension applied to the timing belt 8 is always kept appropriate, whereby noise generation as well as reduction in life is prevented.

When the rod 13 and the plunger 12 move toward the reservoir chamber 16 as described above, there is generated a negative pressure state in the pressure chamber 15, so that the air dissolved in the hydraulic fluid appears as bubbles. The bubbles that have risen up in the pressure chamber 15 enter the space between the plunger-side end wire portion of the coil spring 24 and the inner periphery of the inner hole 11a as well as the space between the plunger-side end wire portion of the coil spring 24 and the outer periphery of the small-diameter portion 12a. The bubbles that have entered the former space are discharged together with the hydraulic fluid through the small clearance 25 into the reservoir chamber 16, when the plunger 12 moves toward the pressure chamber 15. The bubbles that have entered the latter space go into a recess that is formed radially inside the plunger-side end wire portion of the coil spring 24 and between the stepped portion and the small-diameter cylindrical portion 12a of the plunger 12. However, since the aforementioned spaces are in communication with each other through the grooves 30, these bubbles are then forced out together with the hydraulic fluid into the former space and discharged through the small clearance 25 into the reservoir chamber 16, when the plunger 12 moves toward the pressure chamber 15. It is thus possible to prevent, with a simple structure, elastically compressible bubbles from remaining within the pressure chamber 15. Consequently, the automatic hydraulic tensioner continues to operate precisely enough to appropriately maintain the tension applied to the timing belt 8. Further, even if bubbles are mixed in the hydraulic fluid of the reservoir chamber 16 defined in the small- and large-diameter cylindrical portions 12a, 12b, the bubbles are conducted to the notches 14b by the hemispherical shaped projection 14c and are mixed in the air layer 17. Therefore, it is also possible to prevent the bubbles from remaining within the reservoir chamber 16 defined in the small- and large-diameter cylindrical portions 12a, 12b.

Figure 6:
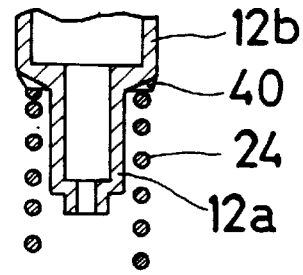
FIG. 6 is a sectional view showing a main part of a modification of the first embodiment as illustrated in FIG. 2.
Figure 7:
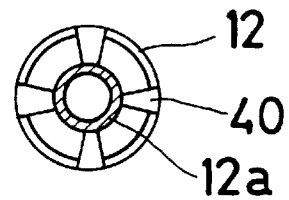
FIG. 7 is a bottom plan view corresponding to FIG. 6.

FIGS. 6, 7 show a main part of a modification of the first embodiment. In this modification, the plunger 12 has radially extending grooves 40 formed in the stepped portion between the small- and large-diameter cylindrical portions 12a, 12b. These grooves 40 are equally spaced apart from each other and have a cross section gradually enlarged toward the outer periphery of the plunger 12. The grooves 40 thus constructed make it easier to discharge bubbles radially outward.

Figure 8:
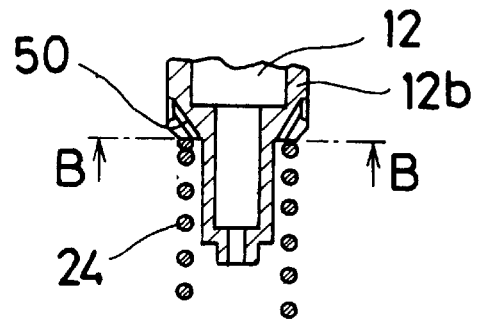
FIG. 8 is a sectional view showing a main part of a second embodiment of the automatic hydraulic tensioner according to the present invention.
Figure 9:
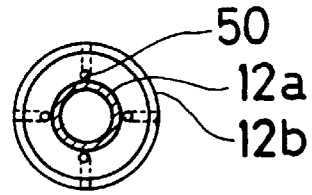
FIG. 9 is a sectional view taken along the line B—B of FIG. 8.
Figure 10:
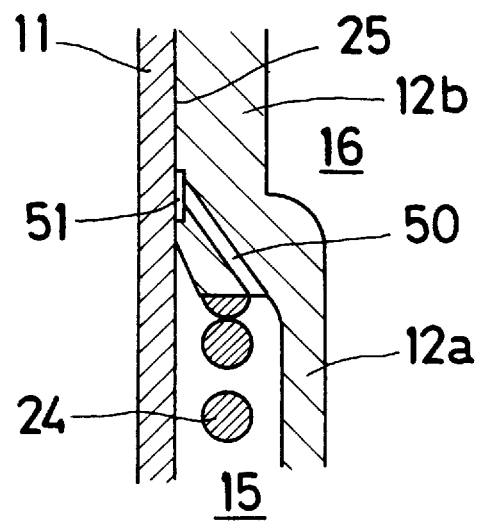
FIG. 10 is an enlarged sectional view showing a main part of the second embodiment as illustrated in FIG. B.
Figure 11:
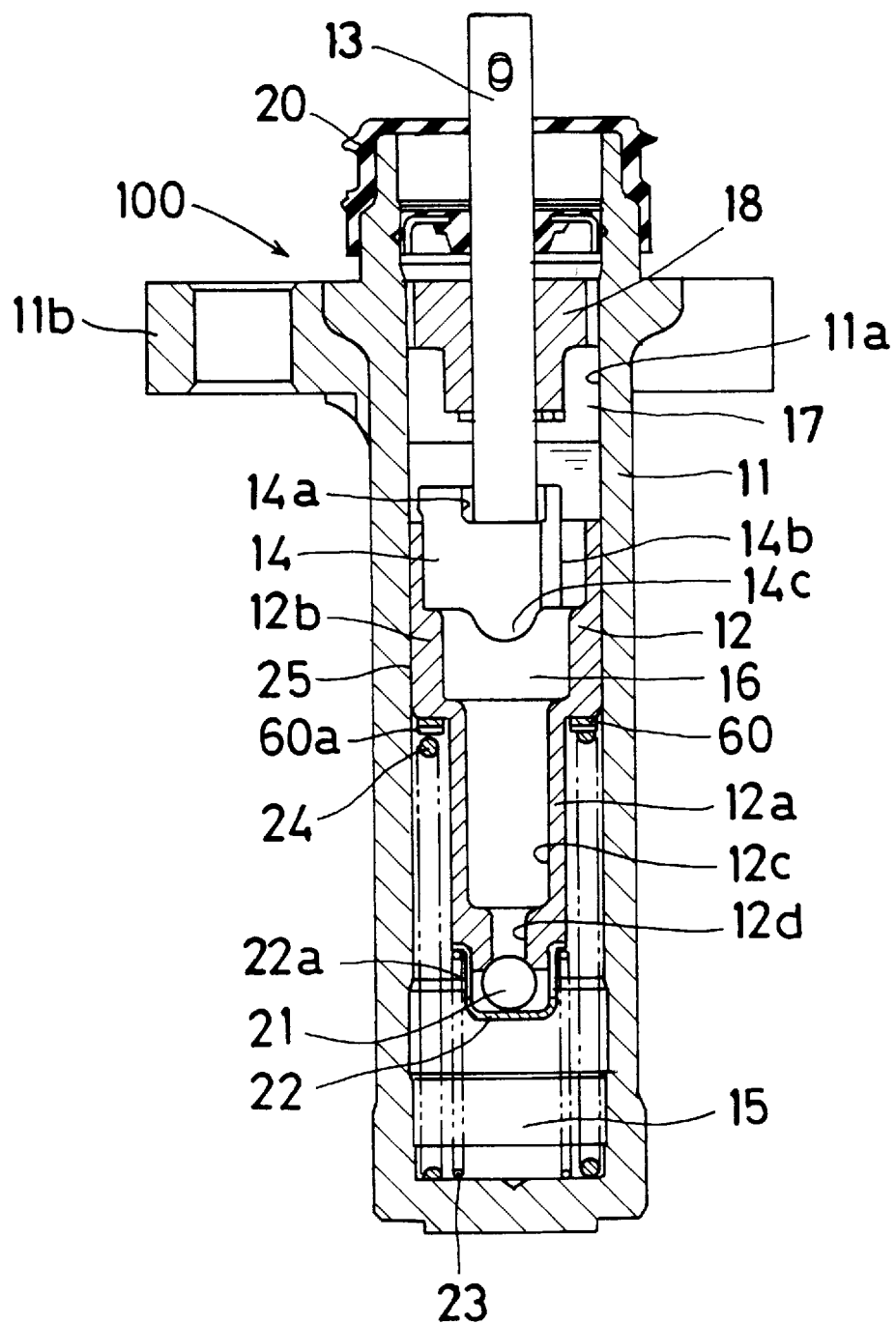
FIG. 11 is a longitudinal sectional view showing a third embodiment of the automatic hydraulic tensioner according to the present invention.

FIGS. 8 through 10 show a main part of a second embodiment of the automatic hydraulic tensioner according to the present invention. In the second embodiment, the large-diameter cylindrical portion 12b has four inclined communication holes 50 formed therethrough. These communication holes 50 are also equally spaced apart from each other. Each of the communication holes 50 has one end leading to the stepped portion between the small- and large-diameter cylindrical portions 12a, 12b of the plunger 12 and the other end leading to the small clearance 25 through the outer periphery of the large-diameter cylindrical portion 12b. The aforementioned one end of each communication hole 50 is exposed to the space between the plunger-side end wire portion of the coil spring 24 and the outer periphery of the small-diameter cylindrical portion 12a. In other respects, the construction of the second embodiment is identical with that of the first embodiment, though not shown in FIG. 8 through 10.

According to the second embodiment, as in the first embodiment, the bubbles that have risen up in the pressure chamber 15 enter the recess that is formed radially inside the plunger-side end wire portion of the coil spring 24 and between the stepped portion and the small-diameter cylindrical portion 12a. However, the recess is in communication with the small clearance 25 between the inner hole 11a of the cylinder 11 and the large-diameter cylindrical portion 12b of the plunger 12 through the communication holes 50. Therefore the bubbles are forced out together with hydraulic fluid into the small clearance 25.

When the plunger 12 moves toward the pressure chamber 15, the bubbles are then discharged through the small clearance 25 into the reservoir chamber 16. It is thus possible to prevent, with a simple structure, elastically compressible bubbles from remaining within the pressure chamber 15. As a is result, the automatic hydraulic tensioner operates precisely enough to appropriately maintain the tension applied to the timing belt. Although the cross section of the communication holes 50 may take any shape, the communication holes 50 preferably have a circular cross section.

Although the first embodiment, the modification thereof and the second embodiment assume that the number of grooves or communication holes to be formed is 4, the present invention is not limited thereby. More specifically, the more grooves or communication holes are formed, the easier it becomes to discharge bubbles. In addition, if the number of grooves or communication holes to be formed is large enough to ensure good bubble discharging capacity, there is virtually no limit as to the direction in which the automatic tensioner is mounted on the engine. However, forming too large a number of grooves or communication holes would increase the number of manufacturing processes. Therefore the number of grooves or communication holes is preferably 3 to 12 and, more desirably, 4 to 8. Furthermore, the grooves may take any shape possible. For example, the surface of the stepped portion may be corrugated to form a plurality of grooves between the surface itself and the portion for receiving the plunger-side end wire portion of the coil spring.

FIGS. 11 through 14 show a third embodiment of the automatic hydraulic tensioner according to the present invention. In the third embodiment, the automatic hydraulic tensioner 100 is different from that of the first embodiment as illustrated in FIG. 1 only in that an annular spacer 60 is interposed between the plunger-side end of the coil spring 24 and the stepped portion of the plunger 12 and that the grooves are not formed on the surface of the stepped portion. In other respects, the construction and effects of the third embodiment are identical with those of the first embodiment as illustrated in FIG. 1. Accordingly, like elements are denoted by like reference numerals and will not be described in any further detail.

Figure 12:
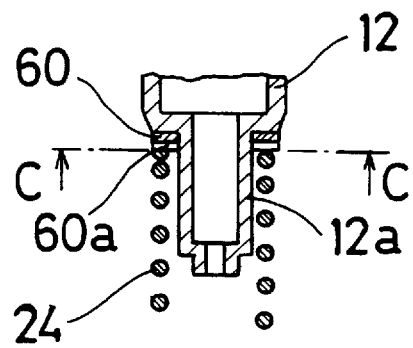
FIG. 12 is a sectional view showing a main part of the third embodiment as illustrated in FIG. 11.
Figure 13:
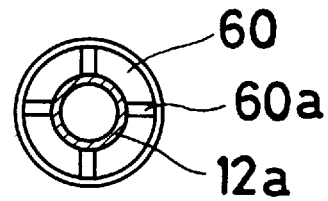
FIG. 13 in a sectional view taken along the line C—C of FIG. 12.
Figure 14A:
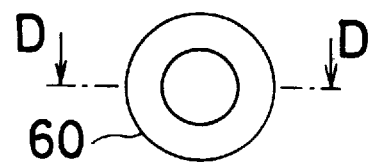
FIGS. 14a through 14c show a spacer of the third embodiment as illustrated in FIG. 11, where 14a is a top plan view of the spacer, 14b is a sectional view taken along the line D—D of 14a, and 14c is a bottom plan view thereof.
Figure 14B:
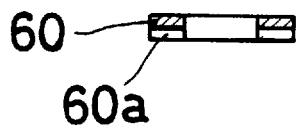
Figure 14C:
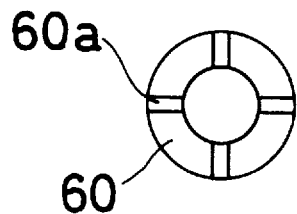

As shown in FIGS. 12 through 14, the surface of the spacer 60 for receiving the coil spring 24 has four radially extending grooves 60a formed therein. The spaces radially inside and outside the plunger-side end wire portion of the coil spring 24 are in communication with each other through the grooves 60a.

According to the third embodiment, as in the first embodiment, the bubbles that have risen up in the pressure chamber 15 enter the recess that is formed radially inside the plunger-side end wire portion of the coil spring 24 and between the stepped portion and the small-diameter cylindrical portion 12a of the plunger 12. However, the spaces radially inside and outside the plunger-side end wire portion of the coil spring 24 are in communication with each other through the grooves 60a. Therefore, the bubbles are forced out together with hydraulic fluid into the space radially outside the plunger-side end wire portion of the coil spring. When the plunger 12 moves toward the pressure chamber 15, the bubbles are then discharged through the small clearance 25 into the reservoir chamber 16. It is thus possible to prevent, with a simple structure, elastically compressible bubbles from remaining within the pressure chamber 15. Consequently; the automatic hydraulic tensioner operates precisely enough to appropriately maintain the tension applied to the timing belt. The cross section of the grooves 60a may take any shape, as long as the grooves 60a can be regarded as recesses.

Figure 15A:
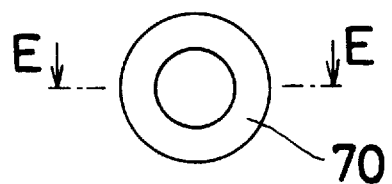
FIGS. 15a through 15c show a spacer of a first modification of the third embodiment as illustrated in FIG. 11, where 15a is a top plan view of the spacer, 15b is a sectional view taken along the line E—E of 15a, and 15c is a bottom plan view thereof.
Figure 15B:
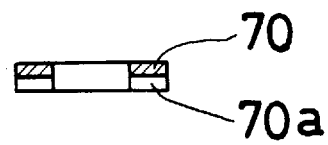
Figure 15C:
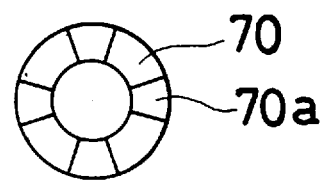

FIG. 15 shows a first modification of the third embodiment, in which there are a plurality of grooves 70a formed in the coil spring receiving surface of a spacer 70. Each of the grooves 70a becomes broader in the circumferential direction of the spacer 70, so that the cross section of the grooves 70a is enlarged toward the outer periphery of the spacer 70. The first modification thus greatly enhances the bubble discharging capacity.

Figure 16A:
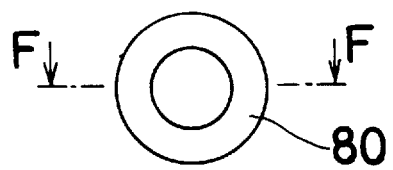
FIGS. 16a through 16c show a spacer of a second modification of the third embodiment as illustrated in FIG. 11, where 16a is a top plan view of the spacer, 16b is a sectional view taken along the line F—F of 16a, and 16c is a bottom plan view thereof.
Figure 16B:
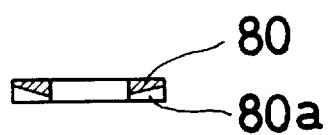
Figure 16C:
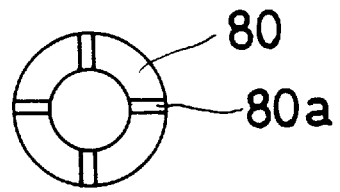

FIG. 16 shows a second modification of the third embodiment, in which there are a plurality of grooves 80a formed in the coil spring receiving surface of a spacer 80. Each of the grooves 80a becomes deeper toward the outer periphery of the spacer 80, so that the cross section of the grooves 80a is enlarged also toward the outer periphery of the spacer 80. As in the first modification, the second modification also greatly enhances the bubble discharging capacity.

Figure 17A:
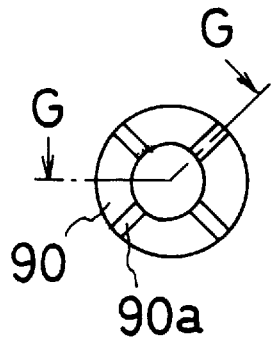
FIGS. 17a through 17b show a spacer of a third modification of the third embodiment as illustrated in FIG. 11, where 17a is a top plan view of the spacer, 17b is a sectional view taken along the line G—G of 17a, and 17c is a bottom plan view thereof.
Figure 17B:
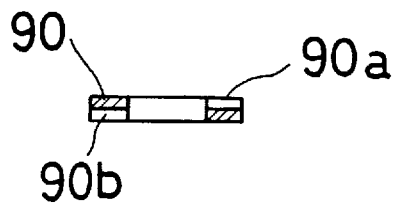
Figure 17C:
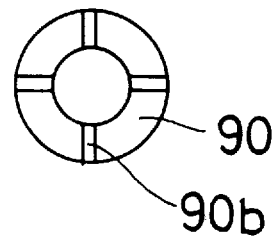

FIG. 17 shows a third modification of the third embodiment, in which there are four radially extending grooves 90a, 90b formed in respective surfaces of a spacer 90. For example, the grooves 90a are formed in one surface of the spacer 90 that receives the coil spring 24 thereon, whereas the grooves 90b are formed in the other surface of the spacer 90 that abuts on a stepped portion of the plunger 12. The grooves 90a, 90b are displaced from each other in the circumferential direction of the spacer 90 by 45°. The spacer 90 may be arranged upside-down. Similarly, the third modification also makes it easy to discharge bubbles.

Figure 18A:
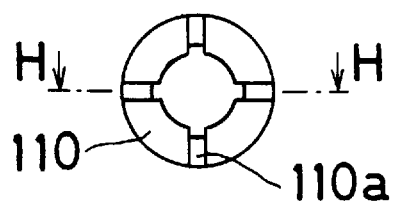
FIGS. 18a through 18c show a spacer of a fourth modification of the third embodiment as illustrated in FIG. 11, where 18a is a top plan view of the spacer, 18b is a sectional view taken along the line H—H of 18a, and 18c in a bottom plan view thereof.
Figure 18B:
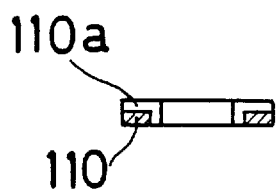
Figure 18C:
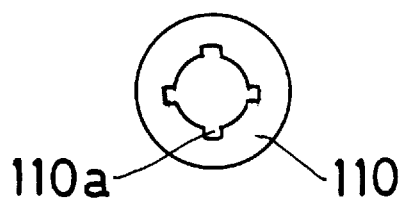
Figure 19:
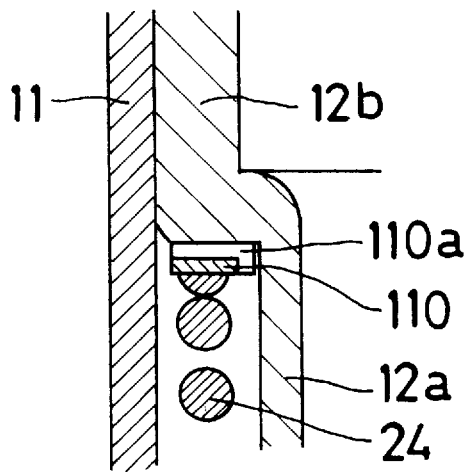
FIG. 19 is a view for explaining the fourth modification as illustrated in FIG. 18.

FIGS. 18, 19 show a fourth modification of the third embodiment, in which there are four radially extending grooves 110a formed in one surface of a spacer 110. Each of the grooves 110a has at the radially inside end thereof an axially extending additional groove portion. According to the fourth modification, it is possible to discharge bubbles not only when the surface provided with the grooves 110a receives the coil spring 24, but also when it abuts on the stepped portion of the plunger 12 as illustrated in FIG. 19. Accordingly, the spacer 110 can also be arranged upside-down, as in the third modification.

Figure 20A:
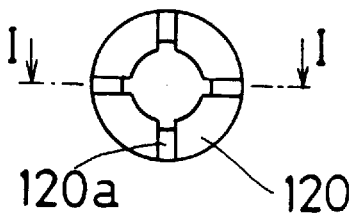
FIGS. 20a through 20c shows a spacer of a fifth modification of the third embodiment as illustrated in FIG. 11, where 20a is a top plan view of the spacer, 20b is a sectional view taken along the line I—I of 20a, and 20c is a bottom plan view thereof.
Figure 20B:
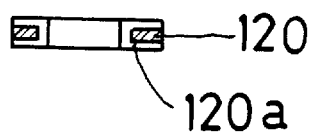
Figure 20C:
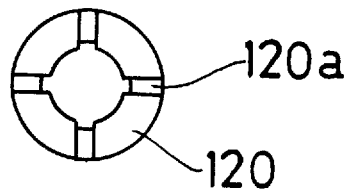

FIG. 20 shows a fifth modification of the third embodiment, which there are four radially extending grooves 120a formed in respective surfaces of a spacer 120. The respective grooves 120a formed in the respective surfaces of the spacer 120 are not displaced from each other in the circumferential direction of the spacer 120. Each pair of the grooves 120a formed in the respective surfaces are in communication with each other at the radially inside end thereof through an axially extending groove. Accordingly, the spacer 120 can also be arranged upside-down, as in the third and fourth modifications.

Figure 21:
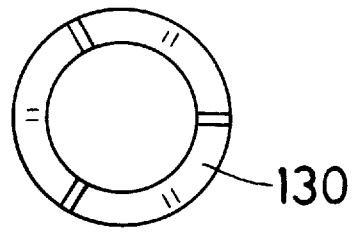
FIG. 21 shows a spacer of a sixth modification of the third embodiment as illustrated in FIG. 11.
Figure 22:
FIG. 22 is a sectional view corresponding to FIG. 21.
Figure 23:
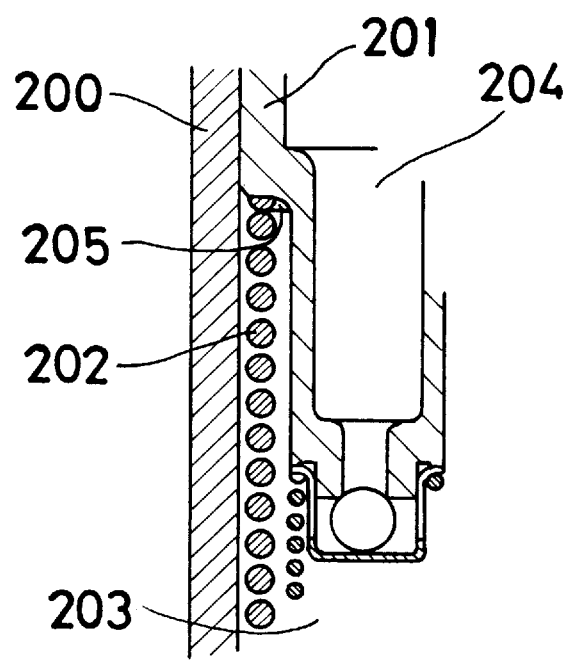
FIG. 23 illustrates a conventional automatic hydraulic tensioner.

FIGS. 21, 22 show a sixth modification of the third embodiment, in which a spacer 130 is corrugated in the circumferential direction. Thus, the same effects as those in the third to fifth modifications can be obtained.

Although the third embodiment and all the modifications thereof assume that the number of grooves or communication holes to be formed is 4, the present invention is not limited thereby. More specifically, the more grooves or communication holes are formed, the easier it becomes to discharge bubbles. In addition, if the number of grooves or communication holes to be formed is large enough to ensure the good bubble discharging capacity, there in virtually no limit as to the direction in which the automatic tensioner is mounted on the engine. However, forming too large a number of grooves or communication holes would increase the number of manufacturing processes. Therefore the number of grooves or communication holes is preferably 3 to 12 and, more desirably, 4 to 8.

In the above mentioned embodiments and modifications thereof, the present invention is applied to an automatic hydraulic tensioner which includes the coil spring 24 disposed within the pressure chamber 15 to apply a tension to the power transmitting means such as a belt, a chain or the like and communication means for allowing a space radially inside a wire at the other end of the coil spring 24 to communicate with the small clearance 25. However, it is possible to apply the present invention to other types of automatic hydraulic tensioners. For example, an automatic hydraulic tensioner which includes a coil spring (first coil spring) disposed within the reservoir chamber to apply a tension to the power transmitting means and a plunger having no small-diameter portion. In this case, one end of the coil spring (first coil spring) is engaged with a first engaging member which is attached to the rod connected to the plunger and the other end of that is engaged with the inner circumferential surface of the inner bore of the cylinder through a second engaging member. In the pressure chamber, an open-end portion of a cup-shaped retainer which accommodates a check ball is fitted around the open-end of a communication passage formed on the plunger so as to communicate the pressure and reservoir chambers. The retainer is provided with a flange extending radially outward along the end surface of the plunger facing the pressure chamber. A coil spring (second coil spring) whose inner diameter is larger than the outer diameter of the retainer is interposed between the flange of the retainer and the closed bottom surface of the inner bore of the cylinder to normally urge the plunger toward the reservoir chamber and to hold the retainer on the plunger. In this constitution, communication means of the present invention in comprised of slits which are formed on the flange of the retainer so as to extend radially outward, or a spacer which is disposed between the flange of the retainer and the end of the coil spring (second coil spring) and which has the same configuration as the spacer shown in FIGS. 12 through 22, or inclined communication holes which are formed on the plunger and one end of each of which is opened into the small clearance and the other end of which is opened into the end surface of the plunger facing the pressure chamber and holes which are formed on the flange of the retainer and each of which is communicated to one end of each communication holes. According to this constitution, it is possible to prevent elastically compressible bubbles from remaining within the pressure chamber. Consequently, the automatic hydraulic tensioner can be operated precisely enough to appropriately maintain the tension applied to the power transmitting means.

According to the present invention, as described above, when the damper mechanism operates such that the plunger quickly slides toward the reservoir chamber with the aid of the urging force of the coil springs, the air dissolved in the pressure chamber appears as bubbles. According to the present invention, these bubbles are forced into the small clearance between the plunger and the cylinder through the communication means. When the plunger slides toward the pressure chamber against the urging forces of the coil springs, the bubbles are then discharged together with hydraulic fluid into the reservoir chamber. It is thus possible to prevent, with a simple structure, elastically compressible bubbles from remaining within the pressure chamber. Consequently, the automatic hydraulic tensioner operates precisely enough to appropriately maintain the tension applied to the power transmitting means.

While the present invention has been described with reference to what are presently considered to be preferred embodiments thereof, it is to be understood that the present invention in not limited to the disclosed embodiments or constructions. To the contrary, the present invention is intended to cover various modifications and equivalent arrangements included within the spirit and scope of the appended claims.

What is claimed is:

1. An automatic hydraulic tensioner comprising:
    a cylinder having one end closed and another end opened;
    a plunger slidably fitted in the cylinder with a small clearance therebetween in accordance with changes in tension applied to power transmitting means;
    a pressure chamber defined by the plunger and the closed end of said cylinder;
    a reservoir chamber defined by said plunger and the open end of said cylinder, said reservoir chamber being formed to communicate with said pressure chamber through said small clearance;
    a cylindrical coil spring disposed within said pressure chamber and having one end securely engaged with said cylinder and an other end engaged with an end surface of said plunger so that said cylindrical coil spring continuously urges said plunger in one direction toward said reservoir chamber; and
    a damper mechanism provided between said pressure chamber and said reservoir chamber, said damper mechanism being formed to allow said plunger to slide quickly in a first direction with the aid of said coil spring in response to a decrease in the tension applied to said power transmitting means, and said damper mechanism being positioned to cooperate with said small clearance to allow said plunger to slide slowly in a second direction against an urging force of said coil spring in response to an increase in the tension applied to said power transmitting means, wherein
    said automatic hydraulic tensioner further comprises coimmunication means for allowing a space radially inside a wire portion of the other end of said coil spring to communicate with said small clearance.

2. The automatic hydraulic tensioner according to claim 1, wherein said communication means includes a plurality of communication grooves that are formed on the end surface of said plunger and extend from the space radially inside said wire portion of the other end of said coil spring to an outer periphery of said plunger.

3. The automatic hydraulic tensioner according to claim 1, wherein said communication means is an annular member interposed between the other end of said coil spring and the end surface of said plunger, said annular member having at least on one side thereof a plurality of groove portions that extend from the space radially inside said wire portion of the other end of said coil spring to an outer periphery of said annular member.

4. The automatic hydraulic tensioner according to claim 2, wherein said communication grooves are formed broader toward the outer periphery.

5. The automatic hydraulic tensioner according to claim 3, wherein said groove portions are formed broader toward the outer periphery.

6. The automatic hydraulic tensioner according to claim 2, wherein said communication grooves are formed deeper toward the outer periphery.

7. The automatic hydraulic tensioner according to claim 3, wherein said groove portions are formed deeper toward the outer periphery.

8. The automatic hydraulic tensioner according to claim 2, wherein said communication grooves are corrugated in a circumferential direction to form a plurality of groove portions between the end surface of said plunger and the other end of said coil spring.

9. The automatic hydraulic tensioner according to claim 3, wherein said annular member are corrugated in a circumferential direction to form a plurality of groove portions between the end surface of said plunger and the other end of said coil spring.

10. The automatic hydraulic tensioner according to claim 1, wherein said communication means is a plurality of communication holes that are formed in said plunger and extend from the end surface of said plunger exposed to the space radially inside said wire portion of the other end of said coil spring to said small clearance.

11. The automatic hydraulic tensioner according to claim 1, wherein said coil spring is positioned to apply a tension to said power transmitting means.

12. The automatic hydraulic tensioner according to claim 1, wherein a second coil spring positioned to apply a tension to said power transmitting means is disposed within said reservoir chamber.

* * * * *